US007308572B2

(12) United States Patent
Goh et al.

(10) Patent No.: US 7,308,572 B2
(45) Date of Patent: Dec. 11, 2007

(54) METHOD OF PRINTING A DOCUMENT

(75) Inventors: Cheh Goh, Bristol (GB); David A Clarke, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 926 days.

(21) Appl. No.: 10/270,393

(22) Filed: Oct. 15, 2002

(65) Prior Publication Data

US 2003/0099353 A1    May 29, 2003

(30) Foreign Application Priority Data

Oct. 13, 2001  (GB) ................. 0124635.4

(51) Int. Cl.
*H04L 9/00*  (2006.01)
*H04K 1/00*  (2006.01)
*G06F 9/44*  (2006.01)
*G06F 15/16*  (2006.01)
*G06F 1/00*  (2006.01)
*G06F 3/12*  (2006.01)
*G06F 3/14*  (2006.01)
*H04M 1/64*  (2006.01)
*H04L 9/30*  (2006.01)
*H04L 9/32*  (2006.01)

(52) U.S. Cl. ................. 713/152; 380/270; 705/7; 713/168; 713/186; 709/229

(58) Field of Classification Search ............ 713/152, 713/185, 176, 168, 186; 380/51, 270; 726/9; 709/229; 705/7
See application file for complete search history.

(56) References Cited

U.S. PATENT DOCUMENTS

| 6,385,728 | B1 * | 5/2002 | DeBry ............ 726/9 |
| 6,751,732 | B2 * | 6/2004 | Strobel et al. ...... 713/176 |
| 2003/0063749 | A1 * | 4/2003 | Revel et al. ........ 380/270 |

FOREIGN PATENT DOCUMENTS

| EP | 0 935 182 | | 8/1999 |
| EP | 1 091 285 | | 4/2001 |
| GB | 2 336 512 | | 10/1999 |
| JP | 2002026895 A | * | 1/2002 |
| WO | WO 00/05642 | | 2/2000 |

OTHER PUBLICATIONS

Parikh, Tapan S.; "Using mobile phones for secure, distributed document processing in the developoing world"; Pervasive Computing, IEEE vol. 4, Issue 2, Jan.-Mar. 2005 pp. 74-81.*

* cited by examiner

*Primary Examiner*—Matthew Smithers
*Assistant Examiner*—Courtney D. Fields

(57) ABSTRACT

A method of printing a document (10) stored at a home computing system (5) on a printer (9) of a remote computing system, the home and remote computing system including a home trusted print proxy (HTPP) (3) and a remote trusted print proxy (RTPP) (2), respectively, which are configured to be able to establish communication via a communications link, in which the printer (9) includes a digital identification device (1) configured to provide a printer public key of a cryptographic public key/private key pair and the RTPP (2) is configured to supply a one time token on request, the method including the steps of using a mobile device (4) to interrogate the RTPP (2) and printer (9) to obtain a one time token and the printer public key using the mobile device (4) to transmit to the home computing system (5) a print request including the one time token and printer public and identification of the document (10) to be printed establishing a secure communications channel between the home and remote computing system via at least the HTPP and RTPP the home computing system (5) transmitting the document encrypted by the printer public key to the printer (9) via the secure communications channel and the printer (9) decrypting the encrypted document and initiating printing of the document only if the mobile device is in communication with the printer (9).

31 Claims, 4 Drawing Sheets

METHOD OF PRINTING A DOCUMENT

BACKGROUND OF THE INVENTION

1. Field of the Invention

This invention relates to method of printing a document.

2. Background to the Invention

There is often a need to print documents away from a user's home environment. For example, travelling sales persons at customer sites, or visitors to competitor/collaborator's locations, often need to print documents not only from the portable device they carry, but also from the file system in their home location. Printing in an environment that is considered as potentially hostile requires not only a guarantee that there is protection of the information sent from the home environment to within the foreign environment and in transit through the internet, but also that the security of the hosting foreign environment is not compromised.

For example, consider a person from company X who has important confidential documents stored in his home storage system. He is visiting a competing company, Y, with a view to establish a collaboration project. This is a preliminary investigation and consequently there is very little safeguard with respect to disclosure of information apart from a standard non-disclosure agreement from the legal department.

This person travels with his mobile device, such as a WAP phone, but nothing else as he does not expect too much progress to be made. Half way through the meeting with company Y, the person decides that he needs to retrieve some confidential information from his home system in order to be able to continue with the discussion.

It may well be that company X does not allow any confidential files to be transported out of the home system and has a configuration to disallow ports that might be used for printing. In the same way, company Y may not allow any outsider to print on their network printer, either on site or by pulling the print job from outside their own firewall.

It can be seen on the one hand, there are the needs of a visitor who wants to print in the foreign environment and, on the other hand, there are the needs of the foreign environment in which printing is to be enabled for the visitor. Their needs, collectively, could be met by what will hereafter be called a Trusted Remote Printing Service (TRPS) which the present invention seeks to provide.

SUMMARY OF THE INVENTION

The present invention provides a method of printing a document stored at a home computing system on a printer associated with a remote computing system which are configured to be able to establish communication between the home system and the printer via a secure communications channel.

The printer includes a digital identification device configured to provide a printer public key of a cryptographic public key/private key pair.

The method includes the steps of using a mobile device to interrogate the printer to obtain the printer public key, and secure communications channel information to enable the secure communications channel to be established using the mobile device to transmit to the home computing system a print request including the printer public key and the secure channel information and identification of the document to be printed establishing the secure communications channel between the home computing system and the printer using the secure channel information the home computing system transmitting the document encrypted with the use of an encryption key to the printer via the secure communications channel and the printer decrypting the encrypted document and initiating printing of the document.

In a further aspect, the present invention provides a computer system adapted to allow secure printing by a user at a remote location of a document stored on a home computing system, the computer system including a printer which includes a digital identification device configured to provide a printer public key of a cryptographic public key/private key pair, and the printer being configured to provide to a mobile device on interrogation by the mobile device the printer public key and secure communications channel information to enable a secure communications channel to be established between the computing system and the home computing system; the printer decrypting an encrypted document and initiating printing of the document on receipt from the home computing system via the secure communication channel.

In a further aspect, the present invention provides a computer system adapted to allow secure printing by a user by a remote computing system of a document stored on the computer system, the remote computer system including a printer which includes a digital device configured to provide a printer public key of a cryptographic public key/private key pair, the computer system being arranged to receive from a mobile device the printer public key, and secure communications channel information to enable a secure communications channel to be established, establish the secure communication channel between the home computing system and the printer using the secure channel information and transmit the document encrypted with the use of an encryption key to the printer via the secure communications channel.

An embodiment of the present invention provides a method of printing a document stored at a home computing system on a printer associated with a remote computing system which are configured to be able to establish communication between the home system and the printer via a secure communications channel, in which the printer includes a digital identification device configured to provide a printer public key of a cryptographic public key/private key pair.

The embodiment may include the steps of using a mobile device to interrogate the printer to obtain (preferably) a one time token, the printer public key, and secure communications channel information to enable the secure communications channel to be established. The mobile device is used to transmit to the home computing system a print request including (preferably) the one time token, the printer public key and the secure channel information and identification of the document to be printed. The secure communications channel is established between the home computing system and the printer using the secure channel information.

The home computing system then transmits the document encrypted with the use of an encryption key to the printer via the secure communications channel and the printer decrypts the encrypted document and initiates printing of the document.

After establishing a secure communication channel between the first and second computing system via the HTPP and RTPP the first computing system transmits the document encrypted by the printer public key to the printer via the secure communication channel and the printer decrypts the encrypted document and initiates printing of the document. The printer may be configured to initialise printing only if the mobile device is in communication with the printer, for example, line-of-sight communication. The printer may be configured to cease printing if the communication link to the mobile device is interrupted for a predetermined, continuous period of time, for example, for 5 or 10 seconds.

Suitable mobile device-printer communications links also include wireless protocols such as "Bluetooth" technology and IEEE 802.11 wireless LAN standard technology or by wire such as serial or parallel port connections or universal serial bus (USB) connections.

The method may use PKCS7 to establish symmetric-key keying material for efficient encrypted communications.

Embodiments of the invention can provide the following advantages to the person at a remote computing system:
  uniqueness: the ability to go to a printer and get a printout, knowing that no other printer is able to render a hard copy using the information in that transaction;
  confidentiality: nobody, apart from that specific printer, outside the traveller's home environment has access to the content printed in that printer, as a result of carrying out that transaction. The information is permanently destroyed immediately after rendering the printing;
  network traversal: the printing can be carried out with the presence of firewalls between the home and the foreign environment; and
  speed: the rendering of contents can be carried out making use of the large bandwidth of the wired world. This also leads to the requirement of convenience, which is the avoidance of using the mobile device as the bridging mechanism over an extended period of time.

Embodiments of the invention can provide the following advantages to the host of the remote computing system:
  confinement: the traveller will only be able to print at the specific printer and will not be able to access any other part of the hosting entity's environment;
  network protection: the protection of the network of the hosting entity must not be compromised as a result of traffic traversing the firewall;
  automated control: the hosting entity is able to automatically manage the printing transaction without having to explicitly check credentials and authorisation rules; and
  confidentiality: the hosting entity can be certain that they will not be able to know the contents of the printout inadvertently, ie., without the explicit permission of the traveller.

Embodiments of the invention can provide a computing system adapted to allow secure printing by a user at a remote location, wherein the computing system and a printer for said secure printing are within a common firewall; wherein said computing system is programmed to provide a remote trusted print proxy (RTPP), and the RTPP includes a digital identification device configured to provide an RTPP public key of a cryptographic public key/private key pair and is configured to supply a one-time token on request, wherein on request by the printer the RTPP provides the RTPP public key, the RTPP network address and the RTPP one-time token, and wherein on contact by a user's home computing system the RTPP is configured to accept the one-time token as authentication and to establish a secure channel with the user's home computing system. The invention also provides a computing system adapted to allow secure printing by a user at a remote location, wherein the computing system and a user account are within a common firewall; wherein said computing system is programmed to provide a home trusted print proxy (HTPP), wherein on request the HTPP is adapted to send a one-time password, the network address of the HTPP and the HTPP public key of cryptographic public/private key pair to a mobile device of the user, and wherein on verification of the one-time password received from a remote printer, the HTPP establishes a secure communications channel with the remote printer and transmits documents encrypted by a public key of the printer to the printer.

Other aspects and advantages of embodiments of the invention will become apparent from the following description of exemplary embodiments taken in conjunction with the accompanying drawings.

DETAILED DESCRIPTION OF EMBODIMENTS OF THE INVENTION

Figure 1:
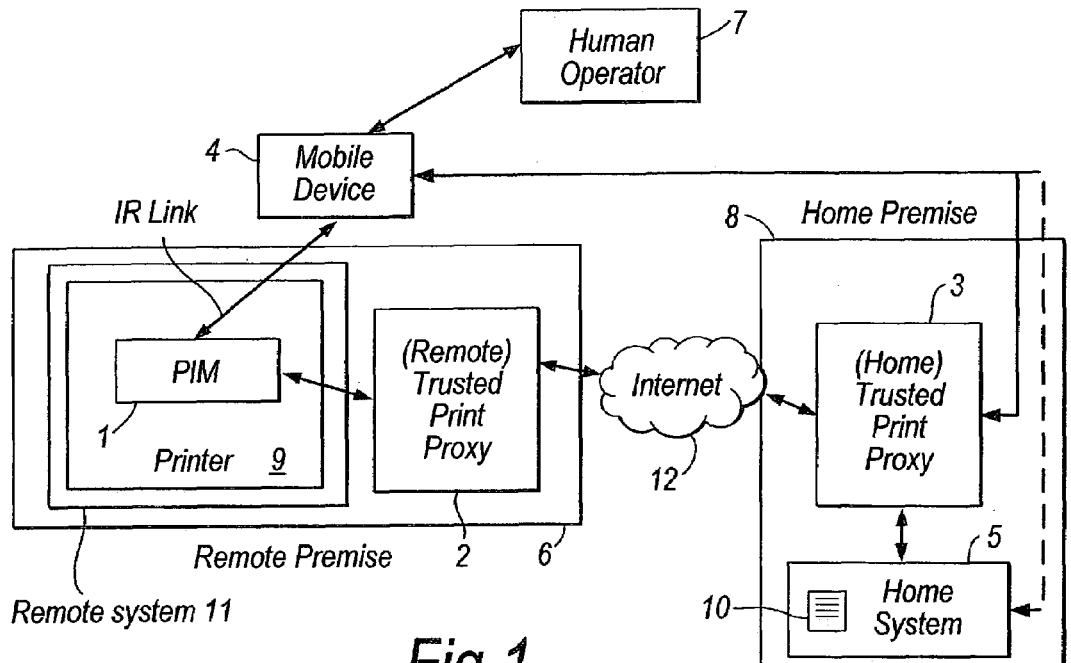
FIG. 1 is a schematic diagram of a first system for implementing methods according to the present invention.

Referring to FIG. 1, an exemplary system for implementing the method of the present invention includes a home premises 8, ie. the user's base such as the company office, and a remote premises 6 where the user, human operator 7, is assumed to be visiting.

At the home premises 8 there is a home computer system 5 on which the file 10 to be printed at the remote premises resides. The remote premises in this particular example have a remote computer system 11 with a printer 9 with PIM 1. The human operator 7 has a mobile device 4, in this example a WAP telephone.

The printer 9 and home system 5 can communicate via a secure channel, if established according to the method of invention, in this particular embodiment mediated by an optional home trusted print proxy (HTPP) 3 and a remote trusted print proxy 2 and, in this embodiment, via the internet 12.

In the following described embodiments of the invention, the communication between the mobile device and the home system is secured for integrity, confidentiality and replay prevention. For example, the WAP phone is used which supports this security need in its interaction with a WAP server, which then connects to the home system over secure channel such as SSL. The level of security is assumed to be "strong enough". Further, the mobile device 4 is one which is able to interact with the printer, in this example, using Infra Red (IR). Other means of interaction could be employed, for example, a wireless or cable connection. As will be seen, a connection between the mobile device 4 and the printer 9 which requires co-location of the mobile device 4 and printer 9, eg. a line-of-sight connection, can be used to ensure printing will only occur in the presence of the user of the mobile device 4.

There are at least two ways to enable secure remote printing with such a system. They are the Push model and the Pull model.

Figure 2:
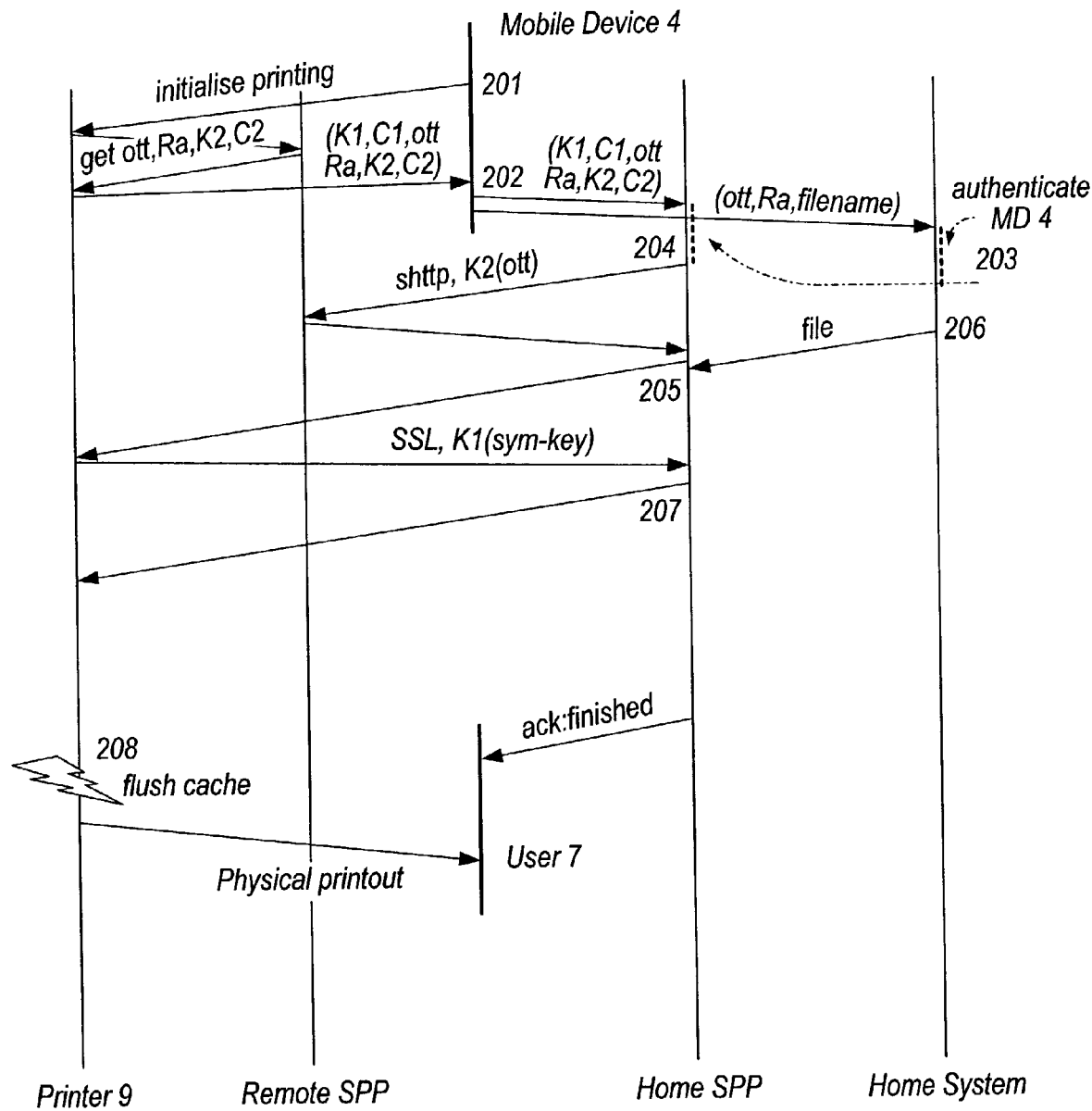
FIG. 2 is a schematic flow diagram of a first embodiment of the method of the present invention.

Referring now to FIG. 2, there is illustrated a method of the present invention in which the printing is effected by the PUSH model including the following steps 201 to 208.

201. User 7 uses mobile device 4 to get K1 the public key and C1 the optional certificate of the printer 9 from its PIM 1, a one time token (ott) from the Remote Trusted Print Proxy (RTPP) 2, Ra the network address of the RTPP 2 and K2 the public key and C2 the optional certificate of RTPP 2 via the printer 9, using, for example, the IR port. The certificates C1 and C2, if employed could include the respective public keys K1 and K2.

202. User 7 will, securely through mobile device 4, use some form of authentication methods to identify herself to the Home Trusted Print Proxy (HTPP) 3, and Home System (HS) 5. She then proceeds to send, in this example, a print request containing K1, C1, ott, Ra, K2, C2 and filename, where filename is the name of the document 10 to be printed in the printer 9.

203. The HTPP 3 and HS 5 verify that the request has been sent by the user and its mobile device.

204. If the public keys K1 and K2 are encapsulated in respective digital certificates C1 and C2, then an additional step of checking the certificates C1 and C2 can be carried out by the home system 5 to establish that they come from a printer and a TPP made by manufacturers who guarantee the machine's behaviour for enabling Trusted Remote Printing.

205. The HTPP 3 will use Ra to contact RTPP 2, and use K2 to establish a secure communication link with RTPP 2, using ott to authenticate itself as the intended source of print contents, for that session.

206. Once the secure communication channel is established, the HS 5 will use the public key of the PIM 1 to establish an encrypted channel with printer 9 and send the material to be printed to the printer 9.

207. The HTPP 3 spools the file 10 from HS 5 and sends it to the printer 9 using the encrypted channel. The RTPP will be acting as a bridge between the printer and the HS 5. For additional security, the system of the present invention may be configured, as in the illustrated embodiments, so that the user must maintain physical vicinity with the printer 9 using the IR connection, for example, of the mobile device 4 in order for the printer 9 to initiate and continue printing. The printer 9 will send the ID of the mobile device back to the HS 5 as indication that the mobile device owner continues to receive the physical printed output. If the IR contact is disrupted for more than certain amount of time, for example, 10 seconds, the printing will be terminated by the HS 5 and the memory of the printer 9 will immediately be flushed.

208. The secure printer will flush its memory upon completion of the print job.

The one-time token can take the form of a randomly generated number and will only have a short life time, say, of 5 minutes.

Figure 3:
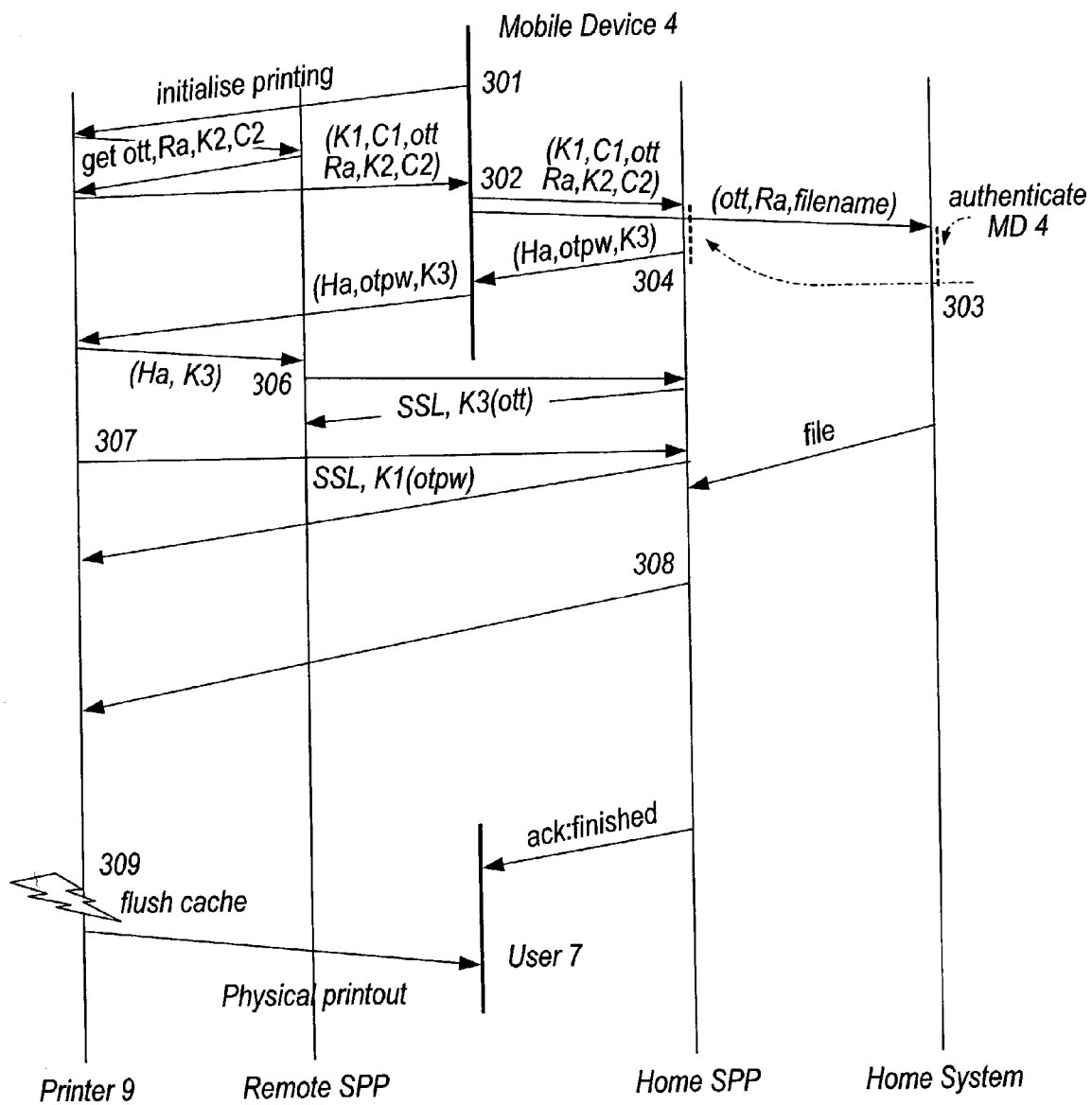
FIG. 3 is a schematic flow diagram of a second embodiment of the method of the present invention.

Referring now to FIG. 3, there is illustrated a method of the present invention in which the printing is affected by the PULL model including the following steps 301 to 309

301. User 7 uses mobile device 4 to get the public key K1 and C1 certificate of the printer 9 from its PIM 1, a one-time token (ott) from the Remote Trusted Print Proxy (RTPP) 2, Ra the network address of the RTPP 2 and the public key K2 and C2 the certificate of RTPP 2 via the printer 9, using, for example, the IR port.

302. User will, securely though mobile device 4, use some form of authentication methods to identify herself to the Home Trusted Print Proxy (HTPP) 3, and the home system (HS) 5. She then proceeds to send a print request containing K1, C1, ott, Ra, K2, C2 and filename, where filename is the name of the document to be printed in the printer 9.

303. The HTPP 3 and HS 5 verify that the request has been sent by the user and its mobile device.

304. After verification, the HTPP 3 will send a one-time password otpw, its network address Ha and its public key K3 to the mobile device 4.

305. User 7 uses mobile device 4 to send printer 9 the otpw, the address Ha and K3 from HTPP, and asks printer 9 to accept a print job from HS 5. Printer 9 asks the RTPP 2 to connect to HTPP 3 using Ha and K3. The otpw never leaves the printer 9 unencrypted.

306. RTPP 2 contacts HTPP 3 using K3 and authenticates itself with HTPP 3 using ott in order to establish a secure channel.

307. The printer 9 authenticates itself as the target printer by encrypting the otpw with K3 and sends it to the HTPP 3.

308. The HTPP 3, upon verifying the otpw, will establish an encrypted channel to send the print image to the printer 9. The RTPP will be acting as a bridge between the printer and the HS 5. The user 7 must, in this embodiment, maintain physical vicinity with the printer 9 using the IR connection of the mobile device in order for the printer 9 to continue printing. The printer 9 will send the ID of the mobile device back to the HTPP 3 as indication that the mobile device owner continues to receive the physical printed output. If the IR contact is disrupted for more than certain amount of time, for example, 10 seconds, the printing will be terminated by the HTPP 3 and the memory of the printer 9 will immediately be flushed.

309. The secure printer will flush its memory upon completion of the print job.

Figure 4:
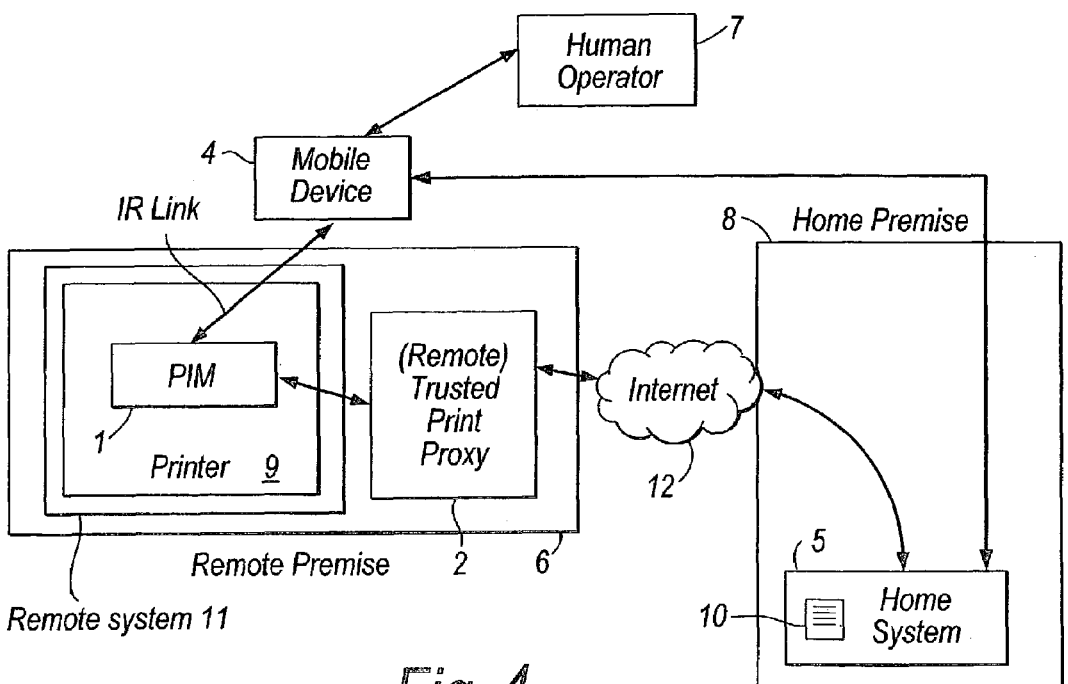
FIG. 4 is a schematic diagram of a second system for implementing methods according to the present invention.

Referring now to FIG. 4, there is shown a further example of a system for implementing the method of printing a document according to the present invention using the PUSH model. This system is as that of FIG. 1 except there is no HTPP. In this system all the functions described as being performed by the HTPP of FIGS. 1 and 2 are here performed instead by the home system 5 and its operation will therefore be fully comprehended from the description of the PUSH operational mode of FIG. 1 but with functions ascribed to the HTPP of FIG. 1 being carried out instead by the home system of FIG. 4.

Figure 5:
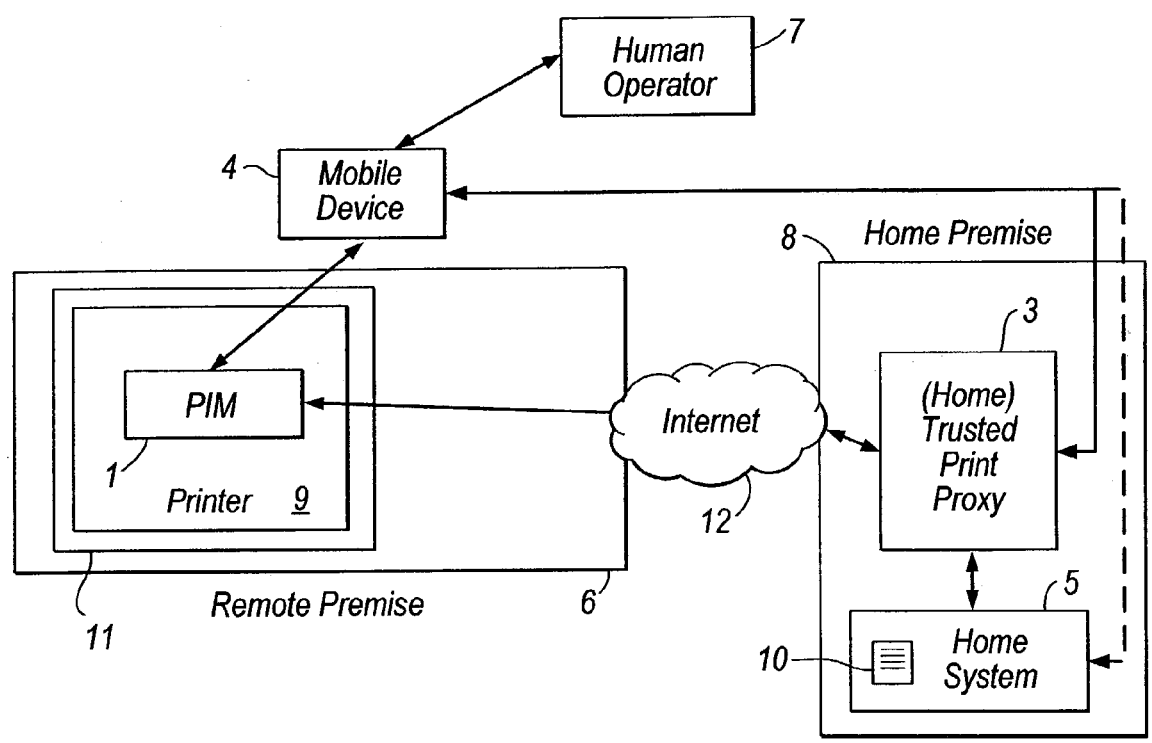
FIG. 5 is a schematic diagram of a third system for implementing methods according to the present invention.

Referring now to FIG. 5, there is shown a further example of a system for implementing the method of printing a document according to the present invention using the PULL model. This system is as that of FIG. 1 except there is no RTPP. In this system all the functions described as being performed by the RTPP of FIGS. 1 and 3 are here performed instead by the printer 9 and its operation will therefore be fully comprehended from the description of the PULL operational mode of FIG. 1 but with functions ascribed to the RTPP of FIG. 1 being carried out instead by the printer 9 of FIG. 5.

The system of FIG. 1 includes two TPP which are used for firewall traversal. In a stripped down version, a minimum of one TPP is required, and its placement is dependent on the model used as discussed with reference to FIGS. 3 and 4. For the "push" model, a TPP is needed at the remote site, while for the "pull" model, a TPP id needed at the home site.

The way the TPP works is for it to accept http connection from the outside firewall. Given that a firewall is normally configured to accept traffic addressed to port 80, the http port, it is reasonable to add the IP address of the TPP to the firewall configuration. In this way, the TPP will be able to accept outside connections, and carry out its function as depicted in the above embodiments. A home TPP is used in the "push" model, while a remote TPP is used in the "pull" systems of FIGS. 3 and 4. As mentioned, they are not strictly necessary. However, in terms of practical implementation, it is desirable to use them. There are several reasons for doing so.

Having an HTPP on site means that potentially all members of the entity will be able to print while on the move, using the "pull" method described above if they come across a printer with a PIM. Secondly, a TPP can become the control point that checks legitimacy of printing documents outside the home site. It is easier to manage out of site printing from a single location, according to the current policy, than to manage it from every possible home system which might send documents to a remote printer. Furthermore, an HTPP can act as the remote print spooler, having a number of print drivers to render documents according to the remote printer type. It is not desirable that every home system has a similar repertory of print driver and the formatting of document using one of the drivers.

A TPP effectively serves as an RTPP if the site is now visited by a travelling user from outside. If the site is somewhere like a conference venue, hotel business centre, or business lounge, then being equipped with an RTPP will enable the site to provide TRPS to its visitors using the "pull" model, regardless of whether the visitors have a TPP at their home site. Even if the remote site is not providing facilities to its visitor as a business, so long as it has two or more printers made available for use by visitors, the configuration of the firewall will have to cater for each printer so that http traffic from the outside firewall through port 80 can go through. It is not good practice to have to configure the firewall with the IP addresses of all the printers. Putting a TPP on the inside so that only one IP address with the http port open is preferable. In addition to this simplification of the firewall administrator's task, the TPP can prevent security holes caused by mistakes in configuration when changes take place. The removal of a printer and the reuse of an IP address for a computer, for example, would no longer be a potential problem.

The use of the method of the present invention can be employed with other types of services, also. Some scenarios are outlined below as potential application of this approach to trusted printing. For example, an entity such as a hospital, may have to deliver records to their member doctors, who are distributed geographically in their own clinics, or in a practice with multiple consultation rooms. Medical records need to be delivered only to the intended physician. A printer rendering the image, document and so forth must be identifiable unequivocally by the sending party, and received uniquely by the intended device.

The human operator (doctor) 7 could be in a location 6 with a number of rendering devices. By securely authenticating him or herself to the home system, where the medical records are kept, the human operator can use a mobile device to render in a printer close by the medical record that is needed for consultations of that day.

In general, printing homed on the authentication of a person may be carried out by the use of smart card or other type of person-homed token. However, when a person is not on location to authenticate themselves, it would be impossible to securely pre-download medical record needed, perhaps for the next day. If the home location has the public key of specific printers and of the TPP in advance, appropriate modification to the trusted printing protocol suggested previously can be made to enable information to be printed automatically.

The converse situation from the first scenario is in the Emergency Room. The medical record of patients in the emergency room is often with the patient's personal general practitioner, and the hospitals to which the patients have visited. If a patient has an insurance policy and the location of his or her medical history is known, there will still be great difficulty in retrieving that information in the emergency room.

Suppose the ER have a PIM enabled printer which has a further additional digital certificate that certifies that it is used by the emergency services, then the systems that keep the medical record can potentially use the public key of the printer and the TPP to render information at the point where the patient needs to be treated. In fact, the point of rendering can even be by an ambulance, or a mountain rescue station and so forth.

Clearly, additional safeguard is needed regarding how the smart card of the duty medical personnel and of the patient, if any, may be needed in conjunction with a modified protocol to achieve medical history rendering. This will depend on the requirements and must undergo a different analysis to arrive at the appropriate process.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the present invention.

The invention claimed is:

1. A method of printing a document stored at a home computing system on a printer associated with a remote computing system which are configured to be able to establish communication between the home system and the printer via a secure communications channel, in which:

the printer includes a digital identification device configured to provide a printer public key of a cryptographic public key/private key pair; and the method including the steps of:

using a mobile device to interrogate the printer to obtain the printer public key, and secure communications channel information to enable the secure communications channel to be established;

using the mobile device to transmit to the home computing system a print request including the printer public key and the secure channel information and identification of the document to be printed;

establishing the secure communications channel between the home computing system and the printer using the secure channel information;

the home computing system transmitting the document encrypted with the use of an encryption key to the printer via the secure communications channel; and the printer decrypting the encrypted document and initiating printing of the document.

2. A method as claimed in claim 1, wherein in the step of using the mobile device to interrogate the printer a one time token is also obtained, and in the step of using the mobile device to transmit to the home computing system a print request the one time token is included in the print request.

3. A method as claimed in claim 1, in which the mobile device is a mobile telephone.

4. A method as claimed in claim 3, in which the mobile telephone is configured to perform the interrogation by any one of an infra-red communications link, a wireless protocol or by a wire connection between the mobile device and the printer.

5. A method as claimed in claim 1, in which the digital identification device is also configured to provide a printer digital certificate.

6. A method as claimed in claim 1, in which the printer public key is in the form of a printer digital certificate.

7. A method as claimed in claim 6, in which the printer digital certificate is presented for acceptability.

8. A method as claimed in claim 1, in which the mobile device provides authentication data to the home computing system prior to transmitting the print request.

9. A method as claimed in claim 1, in which the printer is configured to stop printing and the printer memory is flushed if the mobile device breaks communication with the printer for a predetermined, continuous period of time.

10. A method as claimed in claim 1 in which the printer memory is flushed after printing.

11. A method as claimed in claim 1, in which the printer is configured to initialise printing of the document only if the mobile device is in communication with the printer.

12. A method as claimed in claim 11, in which the printer is further configured to stop printing and the printer memory is flushed if communication between the printer and mobile device is interrupted for a predetermined, continuous period of time.

13. A method as claimed in claim 2, in which the remote computing system includes a remote trusted print proxy (RTPP), and the RTPP includes a digital identification device configured to provide an RTPP public key of a cryptographic public key/private key pair and is configured to supply a one-time token on request, and in which the printer receives from the RTPP the RTPP public key, the RTPP network address and the RTPP one-time token, all of which the printer sends to the mobile device,
the user sends the network address of the RTPP, the public key of the RTPP, the one-time token from the RTPP and the public key of the printer to the home system,
the home system uses the network address of the RTPP to connect to the RTPP, verifying the authenticity of the RTPP using the public key of RTPP, and using the one-time token as authentication for the session and establishes a secure channel with the RTPP,
the RTPP contacts the printer and allows the home system to establish a secure channel with the printer whereupon the home system transmits the document encrypted by the printer public key to the printer via the secure communications channel.

14. A method of claim 1, in which the home computing system includes a home trusted print proxy (HTPP), and in which the HTPP sends a one-time password, the network address of the HTPP and the HTPP public key of cryptographic public/private key pair to the mobile device,
the user sends the network address of the HTPP and the home system public key of cryptographic public/private key pair to the printer with a request that the printer accept printer instructions from the HTPP,
the printer issues a request to the HTPP using the HTPP network address and HTPP public key using the one-time password as authentication and establishes the secure communications channel with the HTPP,
the printer authenticates itself to the HTPP by encrypting the one-time password using the HTPP public key,
the HTPP upon verifying the one-time password establishes the secure communications channel with the printer whereupon the first computing system transmits the documents encrypted by the printer public key to printer via the secure communications channel.

15. A method of claim 2, in which the home computing system includes a home trusted print proxy (HTPP), and the remote computing system includes a remote trusted print proxy (RTPP), the RTPP including a digital identification device configured to provide an RTPP public key of a cryptographic public key/private key pair and is configured to supply a one-time token on request; and in which the HTPP sends a one-time password, the network address of the HTPP and the HTPP public key of cryptographic public/private key pair to the mobile device,
the user sends the network address of the HTPP and the home system public key of cryptographic public/private key pair to the printer with a request that the printer accept printer instructions from the HTPP,
the printer issues a request to the RTPP to connect to the HTPP using the HTPP network address and HTPP public key,
the RTPP contacts the HTPP using the HTPP public key using the one time token as authentication and establishes the secure communications channel with the HTPP,
the printer authenticates itself to the HTPP by encrypting the one-time password using the HTPP public key,
the HTPP upon verifying the onetime password establishes the secure communications channel with the printer whereupon the first computing system transmits the document encrypted by the printer pubic key to printer via the secure channel.

16. A method as claimed in claim 2, in which the home computing system includes a home trusted print proxy (HTPP), the HTPP including a digital identification device configured to provide an HTPP public key of a cryptographic public key/private key pair and is configured to supply a one-time password on request; and the remote computing system includes a remote trusted print proxy (RTPP), the RTPP including a digital identification device configured to provide an RTPP public key of a cryptographic public key/private key pair and is configured to supply a one-time token on request; and in which the printer receives from the RTPP the RTPP public key, the RTPP network address and the RTPP one-time token, all of which the printer sends to the mobile device;
the user sends the network address of the RTPP, the public key of the RTPP, the one-time token from the RTPP and the public key of the printer to the home system,
the user gets in return from the home system the network address of the HTPP, the public key of the HTPP, the one-time password from the HTPP via the mobile device,
the user sends network address of the HTPP, the public key of the HTPP, the one-time password from the HTPP to the printer with a request that the printer accept printer instructions from the HTPP,
the printer issues a request to the RTPP to connect to the RTPP to connect to the HTPP using the network address of the HTPP;
the RTPP verifies the authenticity of the HTPP using the public key of HTPP, and using the one-time token from RTPP as authentication for the session and establishes a secure channel between the RTPP and HTPP,
the RTPP notifies the printer and allows the printer to authenticate itself with the HTPP using the public key of the HTPP, its own public key and the onetime password from the HTPP,
the HTPP upon verifying the one-time password and using the public key of the printer to authenticate the printer establishes the secure communications channel with the printer, whereupon the home system transmits the document encrypted by the printer public key to the printer via the secure channel.

17. The method of claim 1, in which the encryption key is the printer public key.

18. The method of claim 1, in which the printer public key is presented in the form of a digital certificate signed by the printer manufacturer.

19. The method of claim 1, in which the encryption key is a symmetric session encryption key, the method including using the public key as an enveloping key for sending the symmetric session key to the token issuer securely.

20. A method of printing a document stored at a home computing system on a printer associated with a remote computing system which are configured to be able to establish communication between the home system and the printer via a secure communications channel, in which:
    the printer includes a digital identification device configured to provide a printer public key of a cryptographic public key/private key pair; and
    the method including the steps of:
    using a mobile device to interrogate the printer to obtain the printer public key, and secure communications channel information to enable the secure communications channel to be established;
    using the mobile device to transmit to the home computing system a print request including the printer public key and the secure channel information and identification of the document to be printed;
    establishing the secure communications channel between the home computing system and the printer using the secure channel information;
    the home computing system transmitting the document encrypted with the use of an encryption key to the printer via the secure communications channel; and
    the printer decrypting the encrypted document and initiating printing of the document, and in which
    in the step of using the mobile device to interrogate the printer a one time token is also obtained, and in the step of using the mobile device to transmit to the home computing system a print request the one time token is included in the print request.

21. A method of printing a document stored at a home computing system on a printer associated with a remote computing system which are configured to be able to establish communication between the home system and the printer via a secure communications channel, in which:
    the printer includes a digital identification device configured to provide a printer public key of a cryptographic public key/private key pair; and
    the method including the steps of:
    using a mobile device to interrogate the printer to obtain the printer public key, and secure communications channel information to enable the secure communications channel to be established;
    using the mobile device to transmit to the home computing system a print request including the printer public key and the secure channel information and identification of the document to be printed;
    establishing the secure communications channel between the home computing system and the printer using the secure channel information;
    the home computing system transmitting the document encrypted with the use of an encryption key to the printer via the secure communications channel; and
    the printer decrypting the encrypted document and initiating printing of the document, and in which
    the mobile device provides authentication data to the home computing system prior to transmitting the print request.

22. A method of printing a document stored at a home computing system on a printer associated with a remote computing system which are configured to be able to establish communication between the home system and the printer via a secure communications channel, in which:
    the printer includes a digital identification device configured to provide a printer public key of a cryptographic public key/private key pair; and
    the method including the steps of:
    using a mobile device to interrogate the printer to obtain the printer public key, and secure communications channel information to enable the secure communications channel to be established;
    using the mobile device to transmit to the home computing system a print request including the printer public key and the secure channel information and identification of the document to be printed;
    establishing the secure communications channel between the home computing system and the printer using the secure channel information;
    the home computing system transmitting the document encrypted with the use of an encryption key to the printer via the secure communications channel; and
    the printer decrypting the encrypted document and initiating printing of the document, and in which
    the printer is configured to stop printing and the printer memory is flushed if the mobile device breaks communication with the printer for a predetermined, continuous period of time.

23. A method of printing a document stored at a home computing system on a printer associated with a remote computing system which are configured to be able to establish communication between the home system and the printer via a secure communications channel, in which:
    the printer includes a digital identification device configured to provide a printer public key of a cryptographic public key/private key pair; and
    the method including the steps of:
    using a mobile device to interrogate the printer to obtain the printer public key, and secure communications channel information to enable the secure communications channel to be established;
    using the mobile device to transmit to the home computing system a print request including the printer public key and the secure channel information and identification of the document to be printed;
    establishing the secure communications channel between the home computing system and the printer using the secure channel information;
    the home computing system transmitting the document encrypted with the use of an encryption key to the printer via the secure communications channel; and
    the printer decrypting the encrypted document and initiating printing of the document, and in which
    the printer memory is flushed after printing.

24. A method of printing a document stored at a home computing system on a printer associated with a remote computing system which are configured to be able to establish communication between the home system and the printer via a secure communications channel, in which:
    the printer includes a digital identification device configured to provide a printer public key of a cryptographic public key/private key pair, and
    the method including the steps of:

using a mobile device to interrogate the printer to obtain the printer public key, and secure communications channel information to enable the secure communications channel to be established;

using the mobile device to transmit to the home computing system a print request including the printer public key and the secure channel information and identification of the document to be printed;

establishing the secure communications channel between the home computing system and the printer using the secure channel information;

the home computing system transmitting the document encrypted with the use of an encryption key to the printer via the secure communications channel; and the printer decrypting the encrypted document and initiating printing of the document, and in which the printer is configured to initialise printing of the document only if the mobile device is in communication with the printer.

25. A method of printing a document stored at a home computing system on a printer associated with a remote computing system which are configured to be able to establish communication between the home system and the printer via a secure communications channel, in which:

the printer includes a digital identification device configured to provide a printer public key of a cryptographic public key/private key pair; and the method including the steps of:

using a mobile device to interrogate the printer to obtain the printer public key, and secure communications channel information to enable the secure communications channel to be established;

using the mobile device to transmit to the home computing system a print request including the printer public key and the secure channel information and identification of the document to be printed;

establishing the secure communications channel between the home computing system and the printer using the secure channel information;

the home computing system transmitting the document encrypted with the use of an encryption key to the printer via the secure communications channel; and the printer decrypting the encrypted document and initiating printing of the document, and in which the home computing system includes a home trusted print proxy (HTPP), and in which the HTPP sends a one-time password, the network address of the HTPP and the HTPP public key of cryptographic public/private key pair to the mobile device, the user sends the network address of the HTPP and the home system public key of cryptographic public/private key pair to the printer with a request that the printer accept printer instructions from the HTPP, the printer issues a request to the HTPP using the HTPP network address and HTPP public key using the one-time password as authentication and establishes the secure communications channel with the HTPP, the printer authenticates itself to the HTPP by encrypting the one-time password using the HTPP public key, the HTPP upon verifying the one-time password establishes the secure communications channel with the printer whereupon the first computing system transmits the documents encrypted by the printer public key to printer via the secure communications channel.

26. A computer system adapted to allow secure printing by a user at a remote location of a document stored on a home computing system, the computer system including a printer which includes a digital identification device configured to provide a printer public key of a cryptographic public key/private key pair, and the printer being configured to provide to a mobile device on interrogation by the mobile device the printer public key and secure communications channel information to enable a secure communications channel to be established between the computing system and the home computing system; the printer decrypting an encrypted document and initiating printing of the document on receipt from the home computing system via the secure communication channel.

27. A computing system as claimed in claim 26, wherein the computing system and a printer for said secure printing are within a common firewall; wherein said computing system is programmed to provide a remote trusted print proxy (RTPP), and the RTPP includes a digital identification device configured to provide an RTPP public key of a cryptographic public key/private key pair and is configured to supply a one-time token on request, wherein on request by the printer the RTPP provides the RTPP public key, the RTPP network address and the RTPP one-time token, and wherein on contact by a user's home computing system the RTPP is configured to accept the one-time token as authentication and to establish a secure channel with the user's home computing system.

28. A computer system adapted to allow secure printing by a user by a remote computing system of a document stored on the computer system, the remote computer system including a printer which includes a digital device configured to provide a printer public key of a cryptographic public key/private key pair, the computer system being arranged to
  receive from a mobile device the printer public key, and secure communications channel information to enable a secure communications channel to be established;
  establish the secure communication channel between the home computing system and the printer using the secure channel information; and
  transmit the document encrypted with the use of an encryption key to the printer via the secure communications channel.

29. A computing system as claimed in claims 28, wherein the computing system and a user account are within a common firewall; wherein said computing system is programmed to provide a home trusted print proxy (HTPP), wherein on request the HTPP is adapted to send a one-time password, the network address of the HTPP and the HTPP public key of cryptographic public/private key pair to a mobile device of the user, and wherein on verification of the one-time password received from a remote printer, the HTPP establishes a secure communications channel with the remote printer and transmits documents encrypted by a public key of the printer to the printer.

30. A computer system as claimed in claim 26, wherein the printer public key is used by the home computer system to encrypt a document to create the encrypted document.

31. A computer system as claimed in claim 28, wherein the remote computer system is further arranged to:
  encrypt a document by the home computer system using the printer public key to create the encrypted document.

* * * * *